United States Patent
Tan et al.

(10) Patent No.: US 8,923,747 B2
(45) Date of Patent: Dec. 30, 2014

(54) WIRELESS SHARING OF AUDIO FILES AND INFORMATION FOR STREAMLINED PURCHASING

(75) Inventors: Min-Liang Tan, Singapore (SG); Hoe Chan, Singapore (SG); Terence Tang, Singapore (SG)

(73) Assignee: Jook, Inc., Carlsbad, CA (US)

( * ) Notice: Subject to any disclaimer, the term of this patent is extended or adjusted under 35 U.S.C. 154(b) by 763 days.

(21) Appl. No.: 12/451,531

(22) PCT Filed: May 9, 2008

(86) PCT No.: PCT/SG2008/000176
§ 371 (c)(1),
(2), (4) Date: Feb. 11, 2010

(87) PCT Pub. No.: WO2008/143592
PCT Pub. Date: Nov. 27, 2008

(65) Prior Publication Data
US 2011/0166961 A1    Jul. 7, 2011

(51) Int. Cl.
| H04B 7/15 | (2006.01) |
| H04H 60/80 | (2008.01) |
| H04H 20/40 | (2008.01) |
| G06Q 30/06 | (2012.01) |
| H04H 60/23 | (2008.01) |
| H04H 60/74 | (2008.01) |
| H04H 20/38 | (2008.01) |

(52) U.S. Cl.
CPC .............. *H04H 20/40* (2013.01); *H04H 60/80* (2013.01); *G06Q 30/0641* (2013.01); *H04H 60/23* (2013.01); *H04H 60/74* (2013.01); *H04H 20/38* (2013.01); *G06Q 30/0601* (2013.01)

USPC ....... 455/3.01; 455/3.04; 455/41.2; 455/41.3; 709/231; 709/232; 705/27.1

(58) Field of Classification Search
USPC ............. 705/26.1, 27.1; 455/3.04, 41.2, 41.3; 709/231, 232
See application file for complete search history.

(56) References Cited

U.S. PATENT DOCUMENTS

| 5,918,213 A | 6/1999 | Bernard et al. |
| 6,256,303 B1 * | 7/2001 | Drakoulis et al. ............ 370/344 |

(Continued)

FOREIGN PATENT DOCUMENTS

| EP | 1664997 | 12/2007 |
| KR | 10-2003-0071041 | 9/2003 |

(Continued)

OTHER PUBLICATIONS

Audino, "Wireless audio communication network for in-vehicle access of infotainment services in motorcycles", 17th annual IEEE symposium, Dated 2006.*

(Continued)

*Primary Examiner* — Mark Fadok
(74) *Attorney, Agent, or Firm* — Novak Druce Connolly Bove + Quigg LLP

(57) ABSTRACT

A system and method are disclosed for capturing information associated with wireless audio sounds among a plurality of users. When a user encounters audio sound files of interest, the user can capture information regarding the audio sounds, such as title, artist, collection, genre, year, encoding rate, size, playlist, a unique identifier, or other desired information. The information can be used to seamlessly purchase the sound files from a remote digital repository.

38 Claims, 2 Drawing Sheets

(56) References Cited

U.S. PATENT DOCUMENTS

| | | |
|---|---|---|
| 6,434,520 B1 | 8/2002 | Kanevsky et al. |
| 6,570,858 B1 * | 5/2003 | Emmons et al. ............. 370/321 |
| 6,735,628 B2 | 5/2004 | Eyal |
| 6,833,242 B2 | 12/2004 | Quake et al. |
| 6,835,884 B2 * | 12/2004 | Iwamoto et al. ............. 84/609 |
| 6,915,176 B2 | 7/2005 | Novelli et al. |
| 6,941,275 B1 | 9/2005 | Swierczek |
| 7,107,234 B2 | 9/2006 | Deguchi |
| 7,174,293 B2 | 2/2007 | Kenyon et al. |
| 7,206,806 B2 | 4/2007 | Pineau |
| 7,333,957 B2 * | 2/2008 | Levy et al. ..................... 705/58 |
| 8,442,428 B2 * | 5/2013 | Tan et al. ..................... 455/3.06 |
| 8,452,228 B2 * | 5/2013 | Haughay et al. ............. 455/3.04 |
| 2002/0174431 A1 | 11/2002 | Bowman et al. |
| 2003/0130902 A1 * | 7/2003 | Athwal ........................... 705/26 |
| 2005/0060264 A1 | 3/2005 | Schrock et al. |
| 2005/0159829 A1 | 7/2005 | Yeh |
| 2006/0080258 A1 | 4/2006 | Christal |
| 2006/0101132 A1 | 5/2006 | Arisawa et al. |
| 2006/0190968 A1 * | 8/2006 | Jung et al. ..................... 725/74 |
| 2006/0235550 A1 | 10/2006 | Csicsatka et al. |
| 2007/0010195 A1 * | 1/2007 | Brown et al. ................. 455/3.06 |
| 2007/0044010 A1 | 2/2007 | Sull et al. |
| 2007/0061215 A1 | 3/2007 | Waites |
| 2008/0065505 A1 * | 3/2008 | Plastina et al. .................. 705/26 |
| 2008/0068252 A1 * | 3/2008 | Mehta et al. ................... 342/115 |
| 2008/0155057 A1 * | 6/2008 | Khedouri et al. ............. 709/217 |
| 2012/0275618 A1 * | 11/2012 | Tan et al. ........................ 381/80 |

FOREIGN PATENT DOCUMENTS

| | | |
|---|---|---|
| KR | 10-0653262 | 12/2006 |
| TW | 200616368 A | 5/2006 |
| TW | I269586 | 12/2006 |

OTHER PUBLICATIONS

Estrada, Andrew, "Wireless network Headphones IP Case #50V8225", dated 2006.*

"Taiwan Notice of Preliminary Examination," TW Application No. 097117933.

* cited by examiner

WIRELESS SHARING OF AUDIO FILES AND INFORMATION FOR STREAMLINED PURCHASING

FIELD OF THE INVENTION

The present invention relates generally to the field of wireless communications, and more particularly to wireless communication of audio and related data among devices.

BACKGROUND OF THE INVENTION

Many prior art media devices can receive radio broadcasts from such sources such as FM, AM or satellite broadcasts. With respect to headphones, wireless headphones receive music from media devices via a variety of methods, such as infra-red transmission, 25 mhz radio or 2.4 ghz radio transmission technologies such as Bluetooth. Media devices can transfer media files such as music and/or video files wirelessly between other similar media devices via similar methods. The transferring of such files is usually from one storage medium to another.

Despite certain advantages of the foregoing, wired headphones and/or earbuds suffer from limitations. Some such systems allow one user to share the music experience by passing one wired headphone or earbud to a third party. This shared experience, however, does not allow the third party to experience the full stereo experience of the music. Headphone adapter jacks exist for two wired headphones to be connected to the same media device but this also requires both users to be tethered close to the same media device. Shared music by transfer of media files from one storage medium to other storage medium often infringes upon third party intellectual property rights.

Most prior art wireless headphones do not allow users to share music from the same media device such as an MP3 player. Wireless headphones are also limited to the range of the wireless transmitter—consequently, users using wireless headphones cannot be too far from the source. Also, general transmission techniques such as Bluetooth are generally accessible to anyone having the capability to receive that data.

Audio sounds (e.g., music, news broadcasts, podcasts, etc.) can come from a variety of devices such as a digital media player like the Apple iPod®, a CD player or even a radio transmitting commercial radio broadcasts. Prior art teaching regarding sharing of such audio sounds received from such devices present is limited. A device which emits audio sounds can have two pairs of headphones tethered to the same device. Other devices may employ a wireless transmission of audio sounds, e.g. for a radio station, more than one person can listen to the radio broadcast by tuning their radio receiver to the proper radio frequency.

It is often desirable to obtain, communicate and/or store information about audio files. Most audio files in the popular MP3 and AAC formats contain identification information such as an ID3 tag. An ID3 tag is a data container within or associated with an audio file stored in a prescribed format. This data commonly contains the artist name, song title, year and genre of the current audio file.

With prior art digital communications devices that communicate audio sounds, information about the audio sounds is shared in a very limited way, if at all. Although the audio sounds may be shared in some systems, the ID3 tag (or such similar tag) is usually not. It is difficult, and often impossible, for the recipient of the shared audio sounds to identify the name of the song and the artist behind the song. There is also no way of knowing what are the next song(s) and previous song(s) that are on the device's play-list, or the number of songs.

In addition, a person who is receiving the audio sound may want to purchase the same audio sounds from a retailer but is unable to do so as he or she does not know the information behind the audio sound, e.g. title, artist, album, etc. A person who is receiving audio sounds may also want to know more about the person who or the device which is sharing the audio sounds.

SUMMARY OF THE INVENTION

A system and method are disclosed for the seamless capture of audio-file identification data for later evaluation or purchase.

Also disclosed is a digital audio player which features wireless stereo communication to other devices within the network. The device or system of devices incorporates components to transmit and receive audio sounds wirelessly (including by radio, Bluetooth or infra-red technologies) by: (a) having a transmitter/receiver built in (e.g., a wireless transmitter/receiver built into a portable computing device or a digital media player); (b) having an intermediary device that is used to implement the transmission/reception (e.g., a "dongle" transmitter/reception, or a transmitter/receiving station); (c) having the intermediary device that is used to implement the transmission/reception built into the headphones (wired or wireless); or (d) using a similar device or devices to implement the transmission/reception. The audio signal can be selectively rebroadcast to other users.

In addition, the user of the device can also opt to set the device to transmit, re-transmit, broadcast, re-broadcast, receive or not to receive information about the audio sounds in the same manner. The user can opt to transmit or broadcast audio sounds wirelessly (but not necessarily restricted to either radio, Bluetooth or infra-red technologies) to one or more receiving devices respectively. The users of the receiving devices can opt to re-transmit to one device, re-broadcast to more than one device or receive the audio sounds and broadcast their own audio sounds. Through such a device(s), an audio sound sharing network is easily established.

The information on the audio sounds being shared can include information contained in the ID3 tag of digital audio sounds files, or in other such similar places and information that may be manually inserted by the user of the device. Some of that information may include: a) the title of the audio sound; b) the artist behind the audio sound; c) the writer of the audio sound; c) the album/collection the audio sound comes from; d) the genre of the audio sound; e) the year in which it was commercially released; f) the encoding rate of the audio sound if it is a digital media file; g) the size of the file if it is a digital media file; h) a unique identifier associated with the audio file; and i) other information about the audio sound.

Moreover, a method and system is disclosed wherein the user of device can opt to set the device to transmit, re-transmit, broadcast, re-broadcast, receive or not to receive play-list information in addition to the audio sounds and the information on the audio sounds themselves.

BRIEF DESCRIPTION OF THE DRAWINGS

The foregoing and other advantages of the invention will become apparent upon reading the following detailed description and upon reference to the drawings, wherein.

Figure 1:
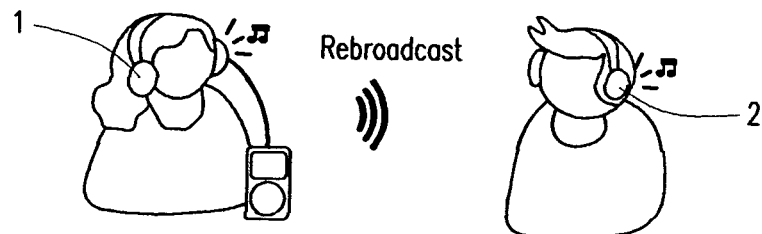
FIG. 1 illustrates a schematic view of a person sharing audio and related information in accordance with one aspect of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As set forth above, embodiments of the invention provide a system and method for seamlessly purchasing audio files encountered in various locations. In one embodiment, the system and method of the present invention are applied to a sound-file sharing network described in exemplary fashion below. A person of ordinary skill in the art will readily understand, however, that the application of the invention is not so limited, and may be applied advantageously in other environments including open networks.

Dedicated and Broadcast Use

As shown in FIG. 1, the user of a device 1 can opt to only transmit a dedicated signal from 1 to another device 2; in this instance, device 2 will be the only receiving device for 1. 2 decodes the signal from 1 to provide the user of 2 with the appropriate/desired audio sounds. As set forth below in further detail, in a preferred embodiment, related information about the audio files is shared as well.

As used herein, the term "dedicated" is used to refer to a closed network, whereby only users of that network may have ready access to the decoding and/or decrypting technology to access the communicated signals. A "closed network" can refer to a network that employs proprietary technology that is not directly interoperable with other standards-based networks, or that adds an additional layer of encoding onto standards-based networks. A "closed network" also encompasses a private network that can only be used by authenticated or authorized devices; e.g., outsider use may be prohibited and enforced through cryptographic means. A closed network is thus distinct from an open network such as Bluetooth, whereby any device that is Bluetooth-enabled may (in the absence of proprietary encoding or encryption) receive and process that signal.

Encryption may be utilized to encrypt data communicated between devices using communication encryption hardware or software to provide a further layer of security to the data communications. Encryption can be used to secure data communications and stored information. Digital communications accommodate the use of encryption. As consumers continue to move from wireline to wireless communications devices, the use of encryption has become more important to the end user in some contexts.

Figure 2:
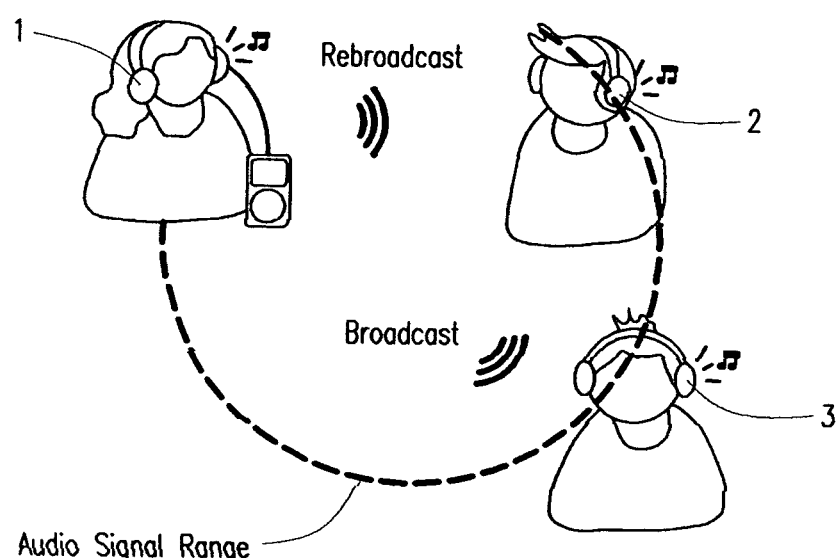
FIG. 2 illustrates a schematic view of a plurality of persons sharing audio (and data) from a single source in accordance with one aspect of the present invention.
Figure 3:
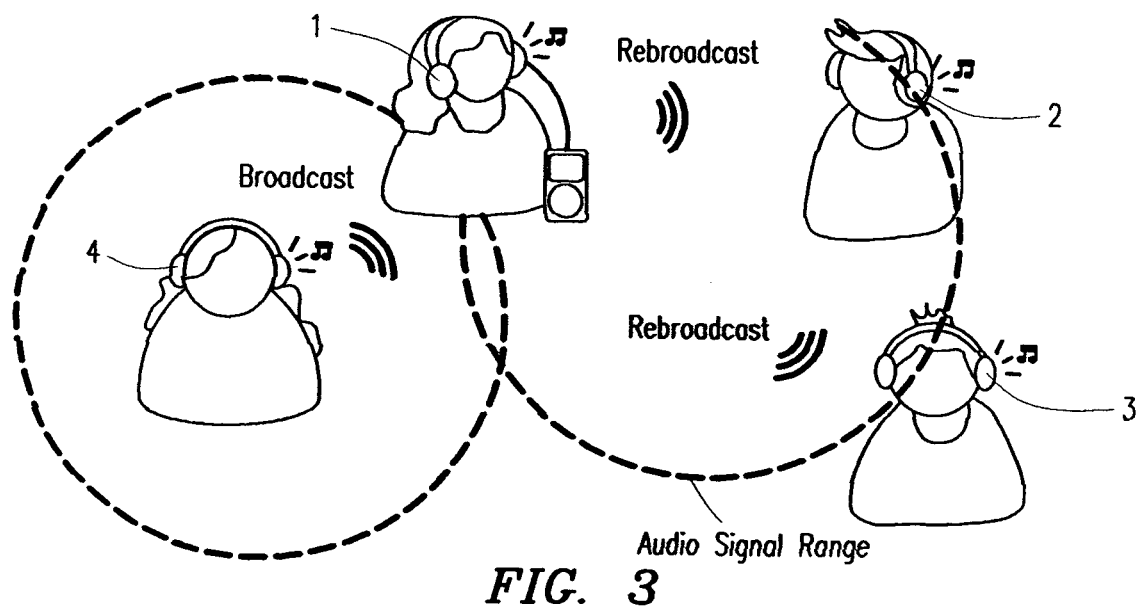
FIGS. 3 and 4 illustrate other embodiments of the invention in which a plurality of rebroadcasts occur.

Referring now to FIG. 2, a user of device 1 can opt to set 1 to broadcast. As such, enabled third parties in the range of transmission of 1, such as the user of a device 3 and potentially others, can opt to set their respective devices to receive from 1, or on a channel on which 1 is set to transmit. 3 and others can now decode the signal from 1 to provide the user of 3 and others with the appropriate/desired audio sounds. As shown in FIG. 3, the user of 1 can also opt to set 1 to receive from other transmitting devices (e.g., 4) belonging to other users.

Rebroadcasting

Figure 4:
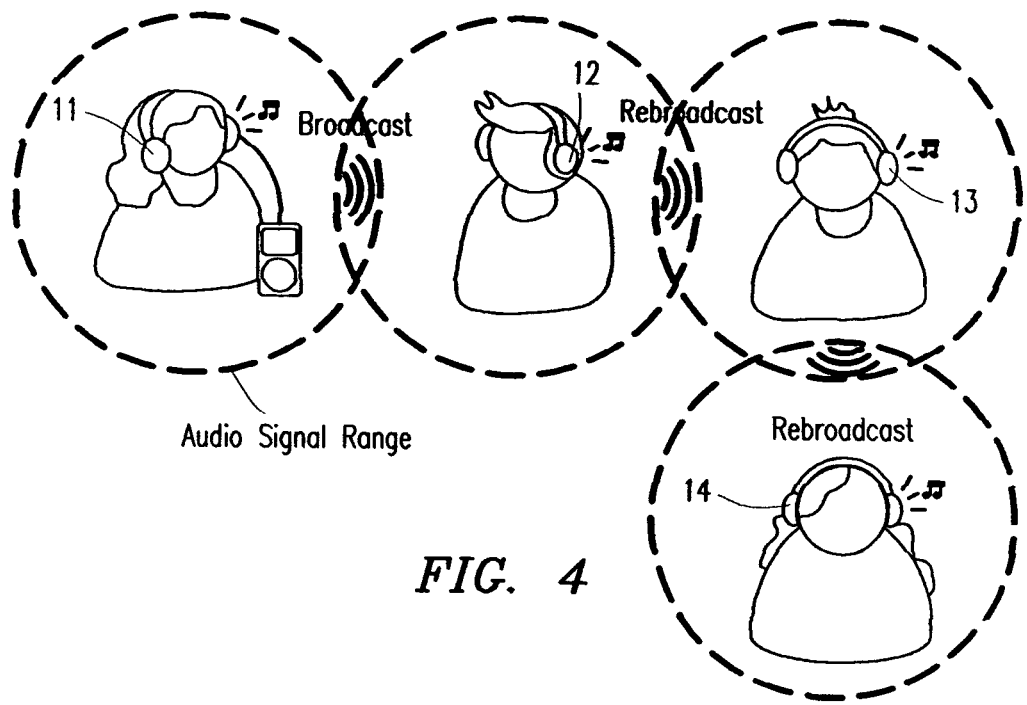

The system and method of the present invention can also be used in the context of re-broadcasting. For example, as shown in FIG. 4, with the user can set 11 on broadcast, the user of 12 which is receiving the audio sounds can opt to set 12 to receive the audio sounds from 11 and to simultaneously re-broadcast the same audio sounds to other users' devices (e.g., 13, 14, etc.). Rebroadcasting may be undertaken before or after decoding the signal; if the latter, the signal will be encoded prior to being retransmitted. The encoding may be the same as, or in some applications different from, the original encoding.

Rebroadcast thus allows user of 13 who is out of the range of 11 but in the range of the re-broadcast of 12 to receive the appropriate audio signals (and, as desired, related information) from 11, via 12. Likewise, if the user of 13 opts to set 13 to re-broadcast, the user of 14, who is out of the range of the broadcast of 11 and the re-broadcast of 12, can opt to set 14 to receive the appropriate audio sounds from 14 via 12 and 13. For all the applications above, the users of 12, 13 and 14 can also set their respective devices to receive the appropriate audio signals which are being re-broadcasted.

Figure 5:
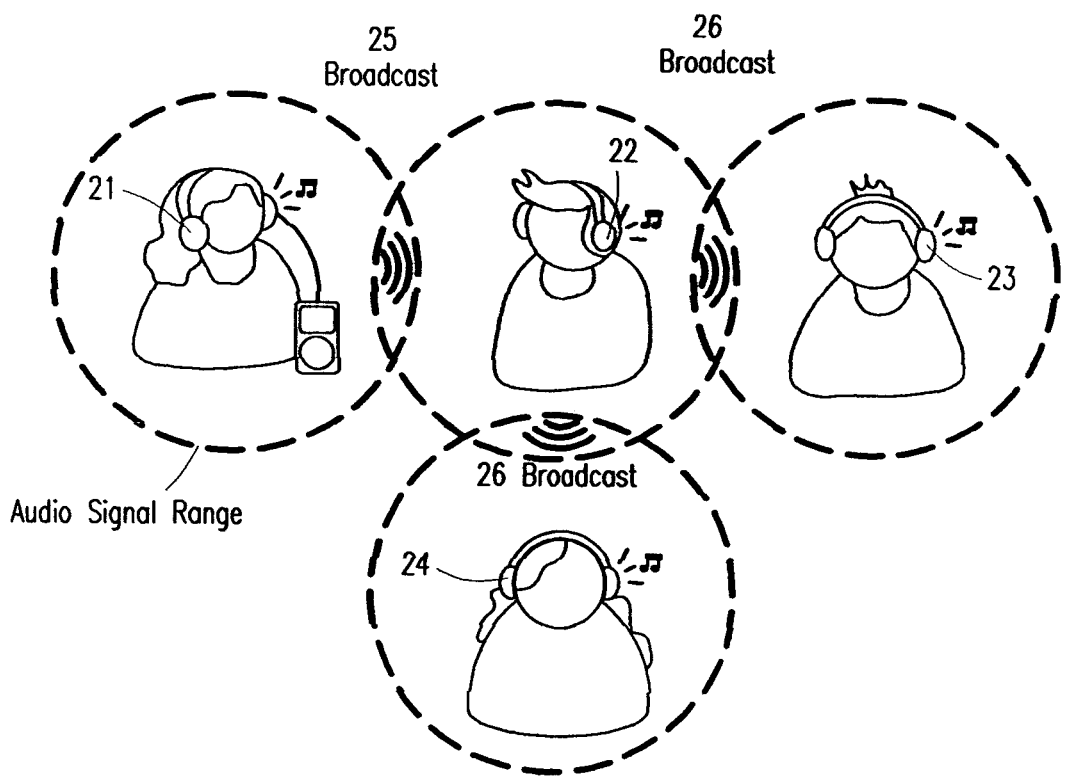
FIG. 5 illustrates another embodiment of the invention in which a plurality of broadcasts occur, and in which differing audio signals and related information may be communicated among the various devices.

FIG. 5 depicts an alternative embodiment of the invention that enables use with the simultaneous reception and transmission/broadcast of different audio sounds. As shown in FIG. 5, the user of 21 sets 21 to transmit or broadcast a certain audio signal 25. The user of 22 can set his device to receive the transmission/broadcast of AS1 from 21. The user of 22 can simultaneously opt to set 22 to transmit or broadcast a different audio sound 26 on a different channel which can be received by users of 23, 24, etc, provided that they have set their respective devices to receive the transmission or broadcast of 26 on that channel from the user of 22.

Embodiments of the present invention also enable use in multi-channel transmission or broadcast (simultaneous or otherwise). With multiple users transmitting in a limited range, the implementation of the wireless transmission may be made in dedicated channels which users may opt to receive either:

i. automatically via hunting and/or frequency hopping; or
  ii. manually by tuning to specific frequencies denoted by:
  iii. discrete channels denoted by numbers (e.g., Channel 1, Channel 2, etc.);
  iv. discrete channels denoted with colors (e.g., Red, Green, Blue); or
  v. other methods consistent with those known to persons of skill in the art.

In order to identify the mode in which a device is operating (transmitting, broadcasting, re-broadcasting or receiving), the user of a device can opt to set either cues on his device or cues to be displayed/received on third parties' device to allow third parties to identify the mode in which a device is operating. The cues could take various forms or combination of forms such as:

a. visual cues, including text, colored indicators or lights, which will indicate the various modes in which the device is operating; and b. sound cues which will indicate the various modes in which the device is operating. Such sounds can either be heard audibly or through use of the device).

(e.g., 21 is set to broadcast 21 flashes a blue light which users of other Devices (22, 23, etc.) can see and then opt to set 22, 23, etc. to receive 21's broadcast.)

Sharing of Related Digital Information

The user of the device can also opt to set the device to transmit, re-transmit, broadcast, re-broadcast, receive or not to receive information about the audio sounds themselves, the users, or the devices.

The information on the audio sounds being conveyed can include, but is not limited to, information contained in the ID3 tag of digital audio sounds files or in other such similar places and information that may be manually inserted by the user of the device. This information can include, though is not limited to:
   a) The title of the audio sound;
   b) The artist or group behind the audio sound;
   c) The writer of a song;
   d) The album or collection on which the audio sound can be found;
   e) The genre of the audio sound;
   f) The year in which it was commercially released;
   g) The encoding rate of the audio sound if it is a digital media file;
   h) The size of the file if it is a digital media file; and
   i) Other desired information about the audio sound.

In a preferred embodiment, the user of device can opt to set the device to transmit, re-transmit, broadcast, re-broadcast, receive or not to receive play-list information in addition to the audio sounds and the information on the audio sounds themselves. Such information contained in the play-list includes but is not limited to:
   a) Information on the next audio sounds) to be played;
   b) The previous audio sound(s) played;
   c) The number of different audio sound(s) which will be played; and
   d) Other information about the play-list Such information can be in a text form and users of the devices can opt to view the information on an associated display.

Further, this invention also claims a method and system where the recipient of the information relating to the audio sounds and/or play-lists can choose to capture and store the information of certain audio sounds as well as the play-list information at his or her option.

With this saved information, the recipient may then download this information to his personal computer or such other media device and the information of the audio sounds or play-list information which the recipient has captured will be downloaded to his computer or such other media device.

In on embodiment, this saved information is linked to online databases. Further information about the audio sounds or play-list information may be obtained in this manner through indexing and retrieval of additional information correlated to the originally saved data.

In a further embodiment, this device may also contain a unique identifier (be it a number or text or a combination of both or some other manner to uniquely identify the device), which may also be set by the user at his discretion.

Users of the device which transmit, re-transmit, broadcast, re-broadcast, receive or not receive audio sounds, information on the audio sounds and/or information on play-lists will be able to detect this unique identifier from other devices and similarly capture such information on the unique identifier, thereby enabling the user to identify the device from or to which it is sharing music and save this information for later.

In addition to this unique identifier, users of the device may also opt to transmit, re-transmit, broadcast, re-broadcast, receive or not to receive text, pictures or audio sounds, or a combination of these, which will be inserted by the user when the device is docked or sync-ed with a personal computer or through user inputs on the device itself.

Such captured information will be linked to a website or database (either online or not) of users of the device and with the captured information, the user will be able to navigate through such the website or database to find out more information about the user(s) whose device identifier had been captured.

The database may contain information about users of the device such as:
   a) Name;
   b) Address;
   c) Music tastes;
   d) Links to websites;
   e) Photographs;
   f) Blogs; and
   g) other information disclosed by the user.

The advantage of this system of sharing is that in addition to creating wireless music sharing networks, a real community of people may also be fostered or built based on shared musical interests or merely by physical proximity which enable sharing and information exchange.

Streamlined Purchase of Sound Files

In a preferred embodiment, the system captures information on audio sounds (e.g., music) from a source, and the captured information can be used by a person to have integrated access to a music store where the audio sounds can be purchased.

The source of the audio sounds can stem from a variety of sources (the "Source") including but not limited to the following:
   a) digital music player (e.g., iPod®, Zune®);
   b) satellite radio;
   c) digital radio;
   d) internet radio; or
   e) online streaming audio.

The Source of audio sounds allow for the playback or transmission, receipt, decoding and playback of digital audio sounds. Digital audio sounds are capable of containing much information about the audio sounds (in addition to the audio sounds themselves) in an ID3 tag or such similar tag. Information contained includes but is not limited to the following:
   a) The title of the audio sound;
   b) The artist behind the audio sound;
   c) The album the audio sound comes from;
   d) The genre of the audio sound;
   e) The year in which it was commercially released;
   f) The encoding rate of the audio sound if it is a digital media file;
   g) The size of the file if it is a digital media file; and
   h) Other information about the audio sound which may be identify the audio sound, including for example a unique identifier for the audio sound or collection associated therewith.

In accordance with the invention, a system (either hardware or software, or a combination thereof) allows the user to capture the information on digital audio sounds from the Source, either through marking the audio sounds:
   a) as the audio sounds are heard/played back;
   b) from the play-list from which it originates either before or after the audio sound is played; or
   c) from the entire playlist itself.

The system includes a control system with a user interface allowing the user to instantiate capture of the information from the Source. If the entire playlist is captured a subset of the playlist can be selected for the purchase step. This captured information is saved by the user and can be viewed or used subsequently at certain location including but not limited to:
a) On the device itself;
b) On the user's computer when the device is docked with the computer and information from the device is downloaded to or sync-ed with the computer, or
c) A stand alone device which provides for the download of the captured Information.

Once this captured information is downloaded by the user (as the case may be), the user can through activation of certain commands on the device itself, the user's computer or at stand-alone machines establish a link through to remote networks such as music retailers having access to digital music libraries. This can take many forms and include though not be limited to the following:
a) The user can use the captured information on his computer and link up directly to online music stores such as the popular iTunes® to directly purchase the audio sounds whose Information he had captured or other audio sounds;
b) The user can use the captured Information on the device to directly link up to music retailers from the device itself and purchase the audio sounds whose Information he had captured or other audio sounds. This may be effected either through a direct wireless or wired link to an online music store or through direct connection from the device itself;
c) The user can be in a special "music zone" which contains specific wireless transmitters/receivers which allow for the user to purchase audio sounds whose Information he had captured or other audio sounds as long as the user is within the "music zone";
d) The user can use the captured Information at a stand-alone "music vending machine" and purchase the audio sounds whose Information he had captured or other audio sounds; or
e) The user can transferred the captured Information to other similar devices and the user of the other similar devices can perform the same functions.

Such a system of purchase can be either be paid based on pre-determined prices for each audio sounds or with credits or be based on a subscription or pre-established account. If confidential information is included to effect payment, it may be transmitted in an encrypted format established with the remote network.

Upon the purchase of the audio sounds, the user will require a medium to which he can transfer the music. This medium may include though not be limited to the following all of which may be able to play back the very audio sounds purchased:
a) the device itself;
b) the digital music player to which the device may be attached or associated;
c) a hard drive;
d) a flash memory card; or
e) CD.

The foregoing discussion focuses principally on the sharing of music and other audio. It is understood, however, that other applications will also be useful. For example, the application could be used in a gaming environment, in which it is desired that a number of players share a similar audio experience. For example, all such members may be sharing a communications "channel" in the virtual environment. In addition, the present invention could be advantageously applied in the areas of education and training, among others.

As noted above, while the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A system for the streamlined purchase of audio files comprising:
a first digital audio system comprising:
a wireless transceiver;
a control system for said wireless transceiver adapted to capture a first signal from a digital source, the first signal representing a first digital audio information set, said control system having a user interface including a user display, a capture input and a purchase input;
said control system for said wireless transceiver further adapted to broadcast a second signal representing said first digital audio information set, said second signal receivable by a second digital audio system,
wherein the digital source and the first digital audio system are within communication range of each other, the first digital audio system and the second digital audio system are within communication range of each other, and the digital source and the second digital audio system are outside communication range of each other;
wherein said first digital audio information set comprises at least a unique identifier for identifying the digital source and linking to a database of digital audio system users, said database containing information about said users and enabling sharing and information exchange among said users, said unique identifier for identifying the digital source and a user of the digital source, and correlating information of the user of the digital source on the database of digital audio system users;
wherein the information of the user of the digital source on the database is receivable by the first digital audio system from the digital source via the first signal received from the digital source; and
wherein the information of the user of the digital source on the database is receivable by the second digital audio system from the first digital audio system via the second signal received from the first digital audio system;
the first digital audio system further comprising:
storage adapted to store said first digital audio information set when a user of the first digital audio system instantiates said capture input; and
a communications module for transferring, when the user of the first digital audio system instantiates said purchase input, said first digital audio information set to a remote network comprising a digital repository, whereby said communication module is adapted to request a purchase from said digital network, said network accesses said digital repository, and whereby said communication module is adapted to receive a first audio file in response to the purchase requested by the user of the first digital audio system, the first audio file associated with said first digital audio information set, wherein the second digital audio system is communicable with the digital network for requesting an independent purchase of the first audio file by a user of the second digital audio system;

wherein the first audio file is receivable by the second digital audio system in response to the purchase requested by the user of the second digital audio system.

2. The system of claim 1, wherein said digital source is a digital music player.

3. The system of claim 1, wherein said digital source is wireless satellite radio.

4. The system of claim 1, wherein said digital source is wireless digital radio.

5. The system of claim 1, wherein said digital source is Internet radio.

6. The system of claim 5, wherein said first signal is wireless.

7. The system of claim 1, wherein said digital source is online streaming audio.

8. The system of claim 1, wherein at least part of a data communication path between said communications module and said remote network is wireless.

9. The system of claim 1, wherein said first digital audio information comprises a second dataset, at least some of which is not available in an ID3 tag data container accessible to said first digital audio system.

10. The system of claim 1, wherein said first digital audio information comprises a second dataset, wherein at least some of said second dataset is manually input by the user of said first digital audio system.

11. The system of claim 1, wherein said first digital audio information comprises a title of said first audio file.

12. The system of claim 1, wherein said first digital audio information comprises an artist associated with said first audio file.

13. The system of claim 1, wherein said first digital audio information comprises an encoding rate associated with said first audio file.

14. The system of claim 1, wherein said first digital audio information comprises a size associated with said first audio file.

15. The system of claim 1, wherein said first digital audio information comprises a playlist associated with said first audio file.

16. The system of claim 1, wherein said first digital audio information comprises a playlist.

17. The system of claim 16, wherein said user of the first digital audio system can, using said user interface, select a plurality of audio files and instantiate said purchase input with respect to said plurality of audio files simultaneously.

18. The system of claim 1, wherein said remote network is within a predefined music zone comprising a specially-adapted transceiver to effect purchase of a plurality of audio files upon request.

19. The system of claim 1, wherein the information contained in the database of digital audio system users comprise any one of the following: a name, an address, music tastes, links to websites, photographs, and blogs.

20. A method of receiving and broadcasting audio signals and purchasing audio files by a first audio interface device and a second audio interface device, the first audio interface device comprising a wireless transceiver, storage and a control system responsive to user input, the first audio interface device coupled to a communications module for purchasing the audio files from an associated digital network, comprising:

capturing a first audio signal from an independent wireless digital source to the first audio interface device with the control system, the first signal representing a set of digital audio information associated with a digital audio file;

broadcasting a second audio signal representing the set of digital audio information from the first audio interface device, the second audio signal receivable by the second audio interface device, wherein the digital source and the first digital audio system are within communication range of each other, the first digital audio system and the second digital audio system are within communication range of each other, and the digital source and the second digital audio system are outside communication range of each other;

extracting a unique identifier from the set of digital audio information for identifying the digital source and linking to a database of digital audio system users, said database containing information about said users and enabling sharing and information exchange among said users, said unique identifier for identifying the digital source and a user of the digital source, and correlating information of the user of the digital source on the database of digital audio system users;

receiving the information of the user of the digital source on the database with the first audio interface device via the first audio signal received from the digital source;

receiving the information of the user of the digital source on the database with the second audio interface device via the second signal received from the first audio interface device;

locally storing said set of digital audio information in storage on the first audio interface device;

upon receipt of a purchase input from a user of the first digital audio system, accessing a remote network with the communications module in requesting a purchase of said digital audio file;

transmitting payment information through the communications module; and receiving said digital audio file on the first audio interface device in response to the purchase requested by the user of the first digital audio system, wherein the second digital audio system is communicable with the remote network for requesting an independent purchase of the digital audio file by a user of the second digital audio system; and wherein the digital audio file is receivable by the second digital audio system in response to the purchase requested by the user of the second digital audio system.

21. The method of claim 20, wherein said wireless digital source is a digital music player.

22. The method of claim 20, wherein said wireless digital source is satellite radio.

23. The method of claim 20, wherein said wireless digital source is wireless digital radio.

24. The method of claim 20, wherein said wireless digital source is Internet radio.

25. The method of claim 20, wherein said set of digital audio information comprises a supplementary dataset, wherein at least some of said supplementary dataset is not available in an ID3 tag data container.

26. The method of claim 20, wherein said set of digital audio information comprises a supplementary dataset, wherein at least some of said supplementary dataset is manually input by the user of said first digital audio system.

27. The method of claim 20, wherein said set of digital audio information comprises a title of said digital audio file.

28. The method of claim 20, wherein said set of digital audio information comprises an artist associated with said digital audio file.

29. The method of claim 20, wherein said set of digital audio information comprises an encoding rate associated with said digital audio file.

30. The method of claim 20, wherein said set of digital audio information comprises a size associated with said digital audio file.

31. The method of claim 20, wherein said set of digital audio information comprises a playlist.

32. The method of claim 31, wherein said user of the first digital audio system can, using said user interface, select a plurality of audio files and instantiate said purchase input with respect to said plurality of audio files simultaneously.

33. The method of claim 20, wherein said payment accessing step comprises wirelessly accessing a remote network.

34. The method of claim 20, wherein said payment information is transmitted wirelessly.

35. The method of claim 20, wherein said digital audio file is transmitted wirelessly.

36. The method of claim 20, wherein said remote network is within a predefined music zone comprising a specially-adapted transceiver to effect purchase of one or more of a plurality of audio files upon request.

37. The method of claim 20, wherein said payment information is encrypted prior to transmission.

38. The method of claim 20, wherein the information contained in the database of digital audio system users comprise any one of the following: a name, an address, music tastes, links to websites, photographs, and blogs.

* * * * *